United States Patent [19]
Kotzin et al.

[11] Patent Number: 6,141,542
[45] Date of Patent: *Oct. 31, 2000

[54] METHOD AND APPARATUS FOR CONTROLLING TRANSMIT DIVERSITY IN A COMMUNICATION SYSTEM

[75] Inventors: Michael D. Kotzin, Buffalo Grove, Ill.; Walter J. Rozanski, Jr., Hurst, Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/904,042

[22] Filed: Jul. 31, 1997

[51] Int. Cl.$^7$ ...................................................... H04B 1/02
[52] U.S. Cl. .......................... 455/101; 455/103; 455/562; 370/331; 375/299
[58] Field of Search .................................. 455/101, 103, 455/442, 446, 562, 67.4; 370/331, 334; 375/299

[56] References Cited

U.S. PATENT DOCUMENTS

| | | | |
|---|---|---|---|
| 4,490,830 | 12/1984 | Kai et al. | 455/101 |
| 5,625,876 | 4/1997 | Gilbousen et al. | 455/101 |
| 5,652,764 | 7/1997 | Kanzaki et al. | 455/101 |
| 5,771,461 | 6/1998 | Bruckert et al. | 455/422 |
| 5,781,541 | 7/1998 | Schneider | 370/342 |
| 5,812,935 | 9/1998 | Kay | 455/101 |
| 5,926,503 | 7/1999 | Kelton et al. | 375/206 |
| 6,023,615 | 2/2000 | Bruckert et al. | 455/277.2 |
| 6,038,263 | 3/2000 | Kotzin et al. | 375/299 |

OTHER PUBLICATIONS

Fading– Resistant Modulation Using Several Rransmitter Antennas Victor M. DaSlviva and Elivno S. Sousa, pp. (1–5), Aug. 1997.

"Fading Resistant Modulation Using Several Transmitter Antennas", Victor M. DaSilva and Elvino S. Sousa, IEEE Transactions on Communications, Ovl. 45, No. 10, Oct., 1997.

*Primary Examiner*—Edward F. Urban
*Assistant Examiner*—Tilahun Gesesse
*Attorney, Agent, or Firm*—L. Bruce Terry

[57] ABSTRACT

Different orthogonal codes ($W_x$, $W_y$) are used to spread common pilot channels ($Pilot_A$) intended for transmission to a particular mobile station (106) within a coverage area (sector A) to implement forward link transmit diversity. The use of different orthogonal codes ($W_x$, $W_y$) for each pilot channel ($Pilot_A$) allows the mobile station (106) to discern which pilot channel spread with a different orthogonal code includes corresponding traffic channel (TCH) information. This allows forward link transmit diversity to be enable/disabled based on conditions associated with the environment, the communications channel, etc. without a complete loss of information as seen by the mobile station (106).

17 Claims, 4 Drawing Sheets

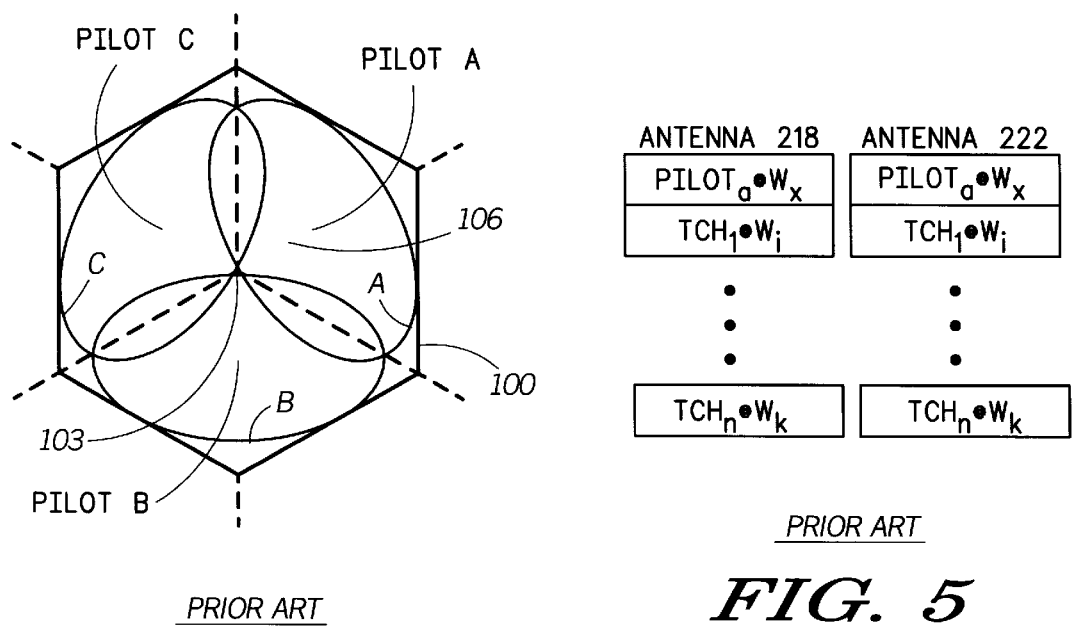
*PRIOR ART*
FIG. 1
*PRIOR ART*
FIG. 5
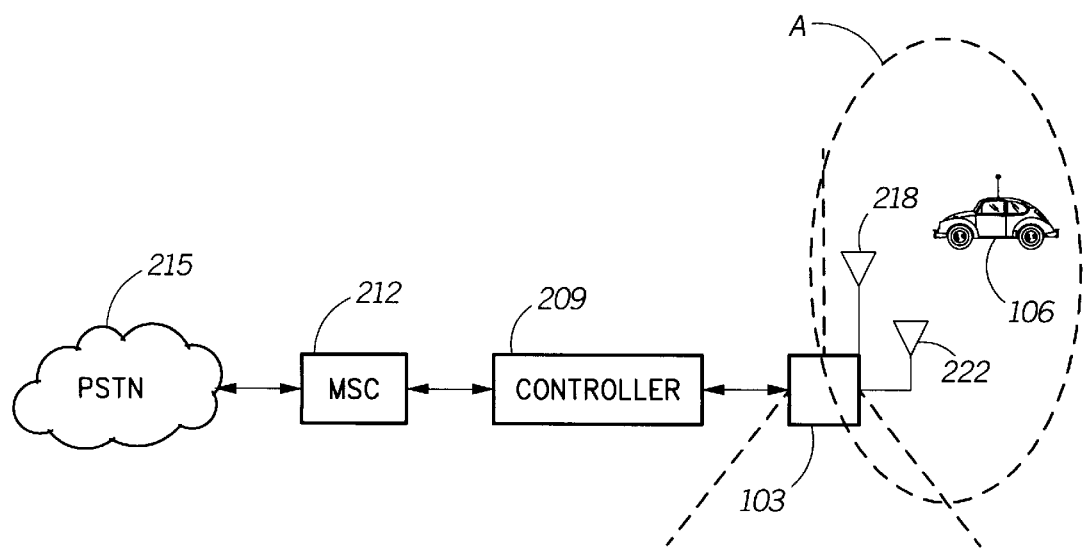
FIG. 2

METHOD AND APPARATUS FOR CONTROLLING TRANSMIT DIVERSITY IN A COMMUNICATION SYSTEM

RELATED APPLICATIONS

The present invention is related to "Method and Apparatus for Transmitting Signals in a Communication System" having Ser. No. 08/904,204 filed on the same date herewith.

FIELD OF THE INVENTION

The present invention relates, in general, to communication systems and, more particularly, to transmitting signals in such communication systems.

BACKGROUND OF THE INVENTION

Forward link (base-station to mobile station) transmit diversity has been proposed for improving the performance of code-division multiple access (CDMA) communication systems. To implement forward link transmit diversity, a delayed (but otherwise identical) copy of the original signal is transmitted from an additional antenna. In the mobile station, a RAKE receiver, well known to those skilled in the art, is capable of resolving these delayed signals and combining them to enhance signal reception, especially when experiencing typical mobile propagation characteristics such as Rayleigh fading is present. A system which implements forward link transmit diversity is able to provide improved sensitivity and robustness to interference and multipath in the CDMA environment.

In current mobile stations, however, the RAKE receiver is only capable of resolving and combining a total of three (3) simultaneous rays. These rays may be produced not only from the forward link transmit diversity technique described, but also created by, inter alia, (a) signals received from other cells intended for the particular subscriber (soft handoff), (b) signals received from other sectors (within a cell) intended for that subscriber (softer handoff), or (c) multiple reflections due to the environment (multipath) of any or all of the above signals. As such, it is clear that under certain situations, the limitations of the RAKE receiver within the mobile station would prevent beneficial utilization of the additional ray produced from the application of forward link transmit diversity. In fact, when such a situation occurs, a degradation in CDMA reception actually occurs, negatively impacting system performance.

One other problem associated with forward link transmit diversity as implemented in a CDMA communication system is that the delayed (but otherwise identical) copy of the original signal transmitted from an additional antenna acts as interference to the original signal. Stated in CDMA terms, the delayed (but otherwise identical) copy of the original signal transmitted from an additional antenna is not orthogonal to the original signal and acts as self-interference. Since CDMA communication systems are interference limited, adding interference to a particular coverage area without maintaining orthogonality likewise causes a degradation in CDMA system performance.

Thus, a need exists for an improved method and apparatus for providing forward link transmit diversity in a CDMA communication system which overcomes the deficiencies of the prior art.

BRIEF DESCRIPTION OF THE DRAWINGS

FIG. 1 generally depicts a 120° sectored cellular coverage area having dedicated pilot channels transmitted throughout the sector as in the prior art.

FIG. 2 generally depicts a block diagram of the 120° sectored cellular coverage area of FIG. 1 supported by a base-station having two antennas to support forward link transmit diversity.

FIG. 5 generally depicts the assignment of orthogonal codes to implement forward link transmit diversity in the prior art.

DETAILED DESCRIPTION OF THE PREFERRED EMBODIMENT

Figure 3:
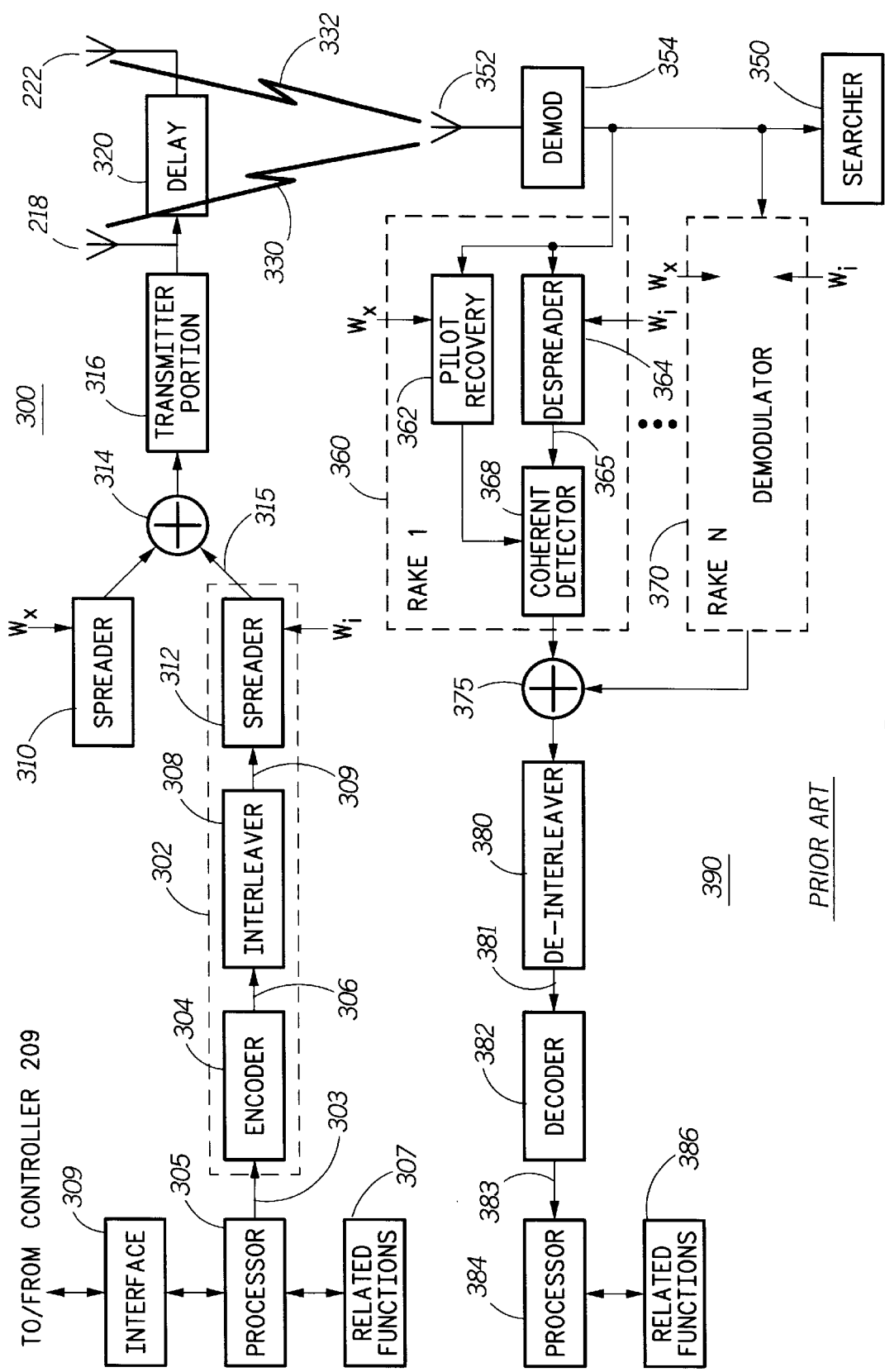
FIG. 3 generally depicts a transmitter of a base-station in CDMA communication with a mobile station using the orthogonal code assignment of the prior art.

Different orthogonal codes on each antenna are used to spread a plurality of common pilot channels intended for transmission to a particular mobile station within a coverage area to implement forward link transmit diversity. By implementing separate, different orthogonal codes for each pilot channel, the pilot signals transmitted via antennas to a common coverage area are orthogonal to one another and thus do not degrade system performance. Additionally, the use of different orthogonal codes for each pilot channel allows the mobile station to discern which pilot channel spread with a different orthogonal code includes corresponding traffic channel information. This allows forward link transmit diversity to be enable/disabled for each traffic channel independently based on conditions associated with the environment, the communications channel, etc. without a complete loss of information as seen by the mobile station. By implementing the present method and apparatus, system interference is minimized.

Generally stated, a method of controlling transmit diversity in a communication system includes the steps of transmitting common traffic channel information to a mobile station within a coverage area on a radio channel via spatially separated antennas and determining characteristics associated with the mobile station and related to the common traffic channel information transmission via the spatially separated antennas. The method then enables or disables a transmission via at least one of the spatially separated antennas based on the determined characteristics associated with the mobile station. The common traffic channel information transmitted to the mobile station is accomplished via pilot channels spread with orthogonal codes and transmitted via the spatially separated antennas. Also, the step of disabling a transmission further comprises instructing the mobile station which pilot channel or pilot channels spread with orthogonal codes to decode.

The step of determining characteristics includes determining when the mobile station requires a soft handoff, and specifically three-way soft handoff. The step of determining characteristics also includes determining when the radio channel transmitted to the mobile station experiences excessive delay spread. This is determined at a base station and the reciprocal properties of the radio channel are used to estimate the amount of delay spread. The step of determining the characteristics associated with the mobile station also includes determining the location of the mobile station within the coverage area. The determined location of the mobile station is correlated with information representing locations within the coverage area known to provide degraded coverage to the mobile station and the transmission via at least one of the spatially separated antennas is disabled when the mobile station is in a location within the coverage area known to provide degraded coverage to the mobile station. In this embodiment, the information representing locations within the coverage area known to provide degraded coverage to the mobile station is stored in a base station or a controller coupled to the base station.

A mobile station in accordance with the invention generally includes means for receiving common traffic channel information transmitted to the mobile station within a coverage area on a radio channel via spatially separated antennas and means for determining characteristics associated with the mobile station and related to the common traffic channel information transmission via the spatially separated antennas. The mobile station further includes means for enabling or disabling a reception of at least one of the transmissions via the spatially separated antennas based on the determined characteristics associated with the mobile station.

In this embodiment, the means for receiving common traffic channel information transmitted to the mobile station within a coverage area on a radio channel via spatially separated antennas further includes means for receiving at least two pilot channels spread with orthogonal codes and transmitted via the spatially separated antennas. The means for disabling a reception further includes means for receiving an instruction indicating to the mobile station which of the at least two pilot channel spread with orthogonal codes to decode. The means for determining the characteristics associated with the mobile station further include means for determining the location of the mobile station within the coverage area and means for receiving information representing locations within the coverage area known to provide degraded coverage to the mobile station. The means for enabling or disabling a reception of at least one of the transmissions via the spatially separated antennas further includes means for enabling or disabling a reception of at least one of the transmissions via the spatially separated antennas based on a comparison between the location of the mobile station and the information representing locations within the coverage area known to provide degraded coverage to the mobile station.

A base-station for controlling transmit diversity in a communication system in accordance with the invention includes means for transmitting common traffic channel information to a mobile station within a coverage area on a radio channel via spatially separated antennas and means for determining characteristics associated with the mobile station and related to the common traffic channel information transmission via the spatially separated antennas. The base station further includes means for instructing the mobile station to enable or disable a transmission via at least one of the spatially separated antennas based on the determined characteristics associated with the mobile station.

In the base-station, the means for transmitting common traffic channel information to the mobile station is accomplished via pilot channels spread with orthogonal codes and transmitted via the spatially separated antennas. The means for instructing the mobile station to enable or disable a transmission further includes means for instructing the mobile station which pilot channel or pilot channels spread with orthogonal codes to decode. Also, the means for determining characteristics further comprises means for determining when the mobile station requires a soft handoff, specifically three-way soft handoff.

The means for determining characteristics further includes means for determining when the radio channel transmitted to the mobile station experiences excessive delay spread which is determined at the base station and the reciprocal properties of the radio channel are used to estimate the amount of delay spread experienced by the mobile station. Also, the means for determining the characteristics associated with the mobile station further includes means for determining the location of the mobile station within the coverage area. The means for determining the characteristics associated with the mobile station further includes means for correlating the determined location of the mobile station with information representing locations within the coverage area known to provide degraded coverage to the mobile station. The means for instructing the mobile station to enable or disable a transmission via at least one of the spatially separated antennas further includes means for instructing the mobile station to enable or disable a transmission via at least one of the spatially separated antennas based on a comparison between the location of the mobile station and the information representing locations within the coverage area known to provide degraded coverage to the mobile station.

FIG. 1 generally depicts a 120° sectored cellular coverage area (cell) having dedicated pilot channels $Pilot_{A-C}$ transmitted throughout their respective sectors as is well known in the prior art. For the sake of convenience, only a single cell 100 is shown in FIG. 1, but one of ordinary skill in the art will appreciate that a typical cellular communications system has many such cells positioned next to one another. As shown in FIG. 1, a base-station 103 having three CDMA transceivers, is centered within the cell 100 at least one of which is capable of communicating to a mobile station 106 via a wireless air interface. In the preferred embodiment, the wireless air interface is compatible with the code-division multiple access (CDMA) cellular communication system defined in IS-95A. For more information on IS-95A, see TIA/EIA/IS-95-A, *Mobile Station-Base Station Compatibility Standard for Dual Mode Wideband Spread Spectrum Cellular System*, March 1995, published by the Electronic Industries Association (EIA), 2001 Eye Street, N.W., Washington, D.C. 20006.

FIG. 2 generally depicts a block diagram of the 120° sectored cellular coverage area of FIG. 1 supported by base-station 103 having two antennas 218, 222 to support forward link transmit diversity. Again, for the sake of simplicity, only the sector A from FIG. 1 is shown in FIG. 2. As stated earlier, base-station 103 shown in FIG. 2 is capable of communicating via CDMA communication channels to a mobile station 106. Coupled to base-station 103 is a controller 209 which performs, inter alia, transcoding and switching functions primarily related to the communication system. Controller 209 is coupled to a mobile switching center (MSC) 212 which primarily performs switching functions related to the land line network. Coupled to MSC 212 is the public switched telephone network (PSTN) 215 which includes, inter alia, originating subscribers, fax machines, etc. which are capable of originating and/or receiving communications to/from mobile station 106 within the CDMA communication system.

Also shown in FIG. 2 are a pair of antennas 218 and 222 which are capable of implementing forward link transmit diversity within the coverage area of sector A. With reference to FIG. 2 and FIG. 5, the problems associated with the prior art implementation of forward link transmit diversity can now be explained. A group of orthogonal codes are assigned to be transmitted via antennas 218 and 222. In the preferred embodiment, the orthogonal codes are Walsh codes. As seen in FIG. 5, a pilot channel Pilot$_A$ is transmitted via antenna 218 and 222 using Walsh code W$_X$. For measurement and acquisition reasons, this pilot is set to have a large amplitude compared to any other individual signals transmitted—perhaps 20% of the maximum total transmitted power. As can also be seen in FIG. 5, all traffic channel information for N separate users (TCH$_N$) is transmitted to mobile station 106 via antennas 218 and 222 with Walsh codes which are different from the Walsh code used for the pilot channel Pilot$_A$, but are the same for the transmissions via antenna 218 and 222. These Walsh codes are shown as Walsh codes W$_i$ through W$_k$. While the signals transmitted between antennas 218 and 222 are delayed in time, and as such a RAKE receiver within the mobile station 106 can resolve and combine these signals into a composite signal, the signals transmitted via antennas 218 and 222 are not orthogonal to one another and thus increase the amount of interference within the coverage area, sector A. As such, and as explained above, some of the potential advantage gained by implementing forward link transmit diversity is mitigated due to the increased interference presented by the copy of the original signal.

FIG. 3 generally depicts a transmitter 300 of a base-station in CDMA communication with a mobile station using the orthogonal code assignment of the prior art. As shown in FIG. 3, information in the form of traffic channel bits 303 input to a encoder 304 via a processor 305 at a particular bit rate (e.g. 9.6 kilobits/second). The processor 305 primarily receives the traffic channel bits 303 from the interface 309 which is coupled to a controller (not shown in FIG. 3). The processor 305 is also coupled to a block designated related functions 307, where functions including call processing, link establishment, and other general functions related to establishing and maintaining cellular communications are performed. In the preferred embodiment, the traffic channel bits 303 include either voice information, data information, or a combination of the two. Encoder 304 encodes the traffic channel bits 303 into data symbols 306 at a fixed encoding rate (1/r) with an encoding algorithm which facilitates subsequent maximum likelihood decoding of the data symbols into data bits (e.g. convolutional or block coding algorithms). For example, encoder 304 is capable of encoding traffic channel bits 303 (e.g., 192 input data bits) received at a rate of 9.6 kilobits/second at a fixed encoding rate of one data bit to two data symbols (i.e., rate=1/2) such that the encoder 304 outputs data symbols 306 (e.g., 384 data symbols output) at a 19.2 kilosymbols/second rate. The encoder 304 is capable of encoding at other rates (i.e., rate=full rate, rate=1/8) as one skilled in the art will appreciate.

The data symbols 306 are input into an interleaver 308 which organizes the data symbols 306 into blocks (i.e., frames) and block interleaves the input data symbols 306 at the symbol level. Within the interleaver 308, the data symbols are individually input into a matrix which defines a predetermined size block of data symbols. The data symbols are input into location in the matrix so that the matrix is filled in a column by column sequence and are individually output from locations in the matrix so that the matrix is emptied in a row by row sequence. The matrix is a rectangular matrix having an integer number of rows and columns which are chosen to increase the output interleaving distance between the consecutively input non-interleaved data symbols. The result is interleaved data symbols 309 which are output by the interleaver 308 at the same data symbol rate that they were input (e.g., 19.2 kilosymbols/second). The predetermined size of the block of data symbols defined by the matrix is derived from the maximum number of data symbols which can be transmitted at a coded bit rate within a predetermined length transmission block. For example, if data symbols 303 are output from the encoder 304 at a 19.2 kilosymbols/second rate, and if the predetermined length of the transmission block is 20 milliseconds, then the predetermined size of the block of data symbols is 19.2 kilo symbols/second multiplied by 20 milliseconds (ms), resulting in 384 data symbols which defines a 16 by 24 matrix. It will be appreciated by those skilled in the art that the data symbols within the stream of encoded, interleaved data bits 309 may be spread according to numerous other algorithms into a sequence of larger length codes without departing from the scope and spirit of the present invention.

The encoded, interleaved data symbols 309 are next input to a spreader 312 which convolves the interleaved symbols 309 with an orthogonal spreading sequence. The orthogonal spreading sequence is a signal which is the product of two signals; the first signal is a QPSK pseudorandom sequence whose time offset is known and the second signal is an orthogonal spreading code such as a Walsh code W$_i$. For more information on the orthogonal spreading sequence, see §3.1.3.1 of ANSI J-STD-008, *Personal Station Base Station Compatibility Requirement for 1.8 to 2.0 GHz Code Division Multiple Access (CDMA) Personal Communications Systems*, Mar. 24, 1995, published by the Electronic Industries Association (EIA), 2001 Eye Street, N.W., Washington, D.C. 20006. The spreader 312 outputs QPSK chips at a rate which is the product of the input rate from interleaver 308 and the length of the orthogonal spreading sequence (e.g., orthogonal spreading sequence of length 64 would be a 64 bit length Walsh Code). This would result in an output rate of the spreader 312 of 1.2288 megachips/second (i.e., 19.2 kilosymbols/second×64).

As shown in FIG. 3, spreader 312 accomplishes the spreading associated with the traffic channel. In this embodiment, the encoder 304, interleaver 308 and spreader 312 comprise a single traffic channel generator 302. For systems requiring multiple traffic channels, traffic channel generator 302 would be duplicated for each traffic channel and its output would be summed by the summer 314 along with the QPSK chips from the spreader 310. Spreader 310 accomplishes the spreading for the pilot channel. As the pilot channel transfers no information bits, no data input from the processor 305 is required. In the preferred embodiment, the information which is spread to form the pilot channel consists of a stream of data comprised of all 0's.

The summed QPSK chips are output from the summer 314 at a rate of 1.2288 megachips/second, and are input into the transmitter portion 316 of the transmitter 300. The transmitter portion 316 prepares the summed QPSK chips for transmission over a communication channel by upconverting them to the appropriate transmit frequency. Following upconversion, the signal is bandpass filtered to remove unwanted sideband energy and then is output from the transmitter portion 316. The modulated signal from the transmitter portion 316 is provided to an antenna 318 for transmission over the radio communications path 330. The signal from transmitter portion 316 is also directed to a delay circuit 320 which delays the modulated signal, where it is then provided to antenna 322 for transmission over the radio communication path 332. By providing the receiver 390 with two signals 330 and 332, each of which are delayed from one another by a predetermined amount, diversity at the receiver 390 is accomplished.

Still referring to FIG. 3, a receiver 390 receives the sum of both transmitted spread-spectrum signals from the radio communication paths 330 and 332 through antenna 352 and is passed to the demodulator 354. The demodulator 354 filters the input signal to remove unwanted adjacent frequency signals after down-conversion from the transmit frequency and sampling at a predetermined rate (e.g., 1.2288 megasamples/second). The QPSK sampled signal from demodulator 354 is despread by the despreader 364 by correlating the received sampled signals with the despreading code, where the despreading code is a copy of the original spreading sequence. Recall that the original orthogonal spreading sequence is the product of two signals; the first signal is a QPSK pseudorandom sequence whose time offset is known and the second signal is an orthogonal spreading code such as Walsh code $W_i$. The resulting despread sampled signal 365 is sampled at a predetermined rate, for example, 19.2 kilosamples/second, so that a sequence of 64 samples of the received spread-spectrum signal is despread. This signal is represented by a single complex (amplitude and phase) data sample and output to a coherent detector 368 for coherent detection.

As can be seen in FIG. 3, the output of demodulator 354 is also fed to the pilot recovery circuit 362 wherein a process similar to that performed by the despreader 364 is completed, except that the Walsh code $W_x$ is used for recovery rather than Walsh code $W_i$. Output from both the pilot recovery circuit 362 and the despreader 364 are input to the coherent detector 368 which takes the complex conjugate of the output of the pilot recovery circuit 362 and multiplies this by the output of the despreader 364. The real part of the solution is passed as an output of coherent detector 368 (the imaginary part of the complex multiply is discarded).

The output of the demodulator 354 is also provided to a searcher 350 which searches for all signals spread with Walsh code $W_x$ which are generated by base-station transmitter 300. In this instance the searcher 350 would find two signals, one from radio communication path 330 and the other from radio communications path 332. With this information, the search 350 assigns a first finger RAKE receiver 360 and a second finger RAKE receiver 370 to each of these paths. Both rake finger receivers 360 and 370 are identical in operation. The output of the RAKE receivers 360 and 370 are summed by summer 375 and the output of the summer 375 is provided to de-interleaver 380, which essentially "undoes" the interleaving process performed by the interleaver 308. In the de-interleaver 380, the data symbols are individually input into a matrix which is the same size as the matrix in the interleaver 308. The data symbols are input into a location in the matrix such that the matrix is filled in a row by row sequence and the data symbols are individually output from locations in the matrix such that the matrix is emptied in a column by column sequence.

The de-interleaved soft decision data 381 output from the de-interleaver 380 are input to a decoder 382 which uses well known maximum likelihood sequence estimation (MLSE) decoding techniques to generate estimated traffic channel data bits 383. The MLSE decoding techniques may be augmented by using an algorithm which is substantially similar to a Viterbi decoding algorithm. The decoder 382 uses a group of the individual soft decision data 381 to form a set of soft decision transition metrics for use at each particular time state of the MLSE decoder 382. The number of soft decision data 364 in the group used to form each set of soft decision transition metrics corresponds to the number of data symbols 306 at the output of the convolutional encoder 304 generated from each input data bit 303. The number of soft decision transition metrics in each set is equal to two raised to the power of the number of soft decision data 364 in each group. For example, when a 1/2 convolutional encoder is used in the transmitter 300, two data symbols 306 are generated from each input data bit 303. Thus, decoder 366 uses groups of two individual soft decision data 381 to form four soft decision transition metrics for use at each time state in the MLSE decoder 382. The estimated traffic channel data bits 383 are generated at a rate related to the rate at which the soft decision data 381 are input to the decoder 382 and also the fixed rate used to originally encode the traffic channel bits 303. As an example, if the soft decision data 381 are input at 19.2 kilosymbols/second rate and the original encoding rate was 1/2, then the estimated traffic channel bits 383 are output at a rate of 9600 bits/second. The estimated traffic channel bits 383 are input into a processor 384 which, together with a related functions block 386, present the estimated traffic channel bits 383 in a form suitable for use by the user of the mobile station.

Figure 4:
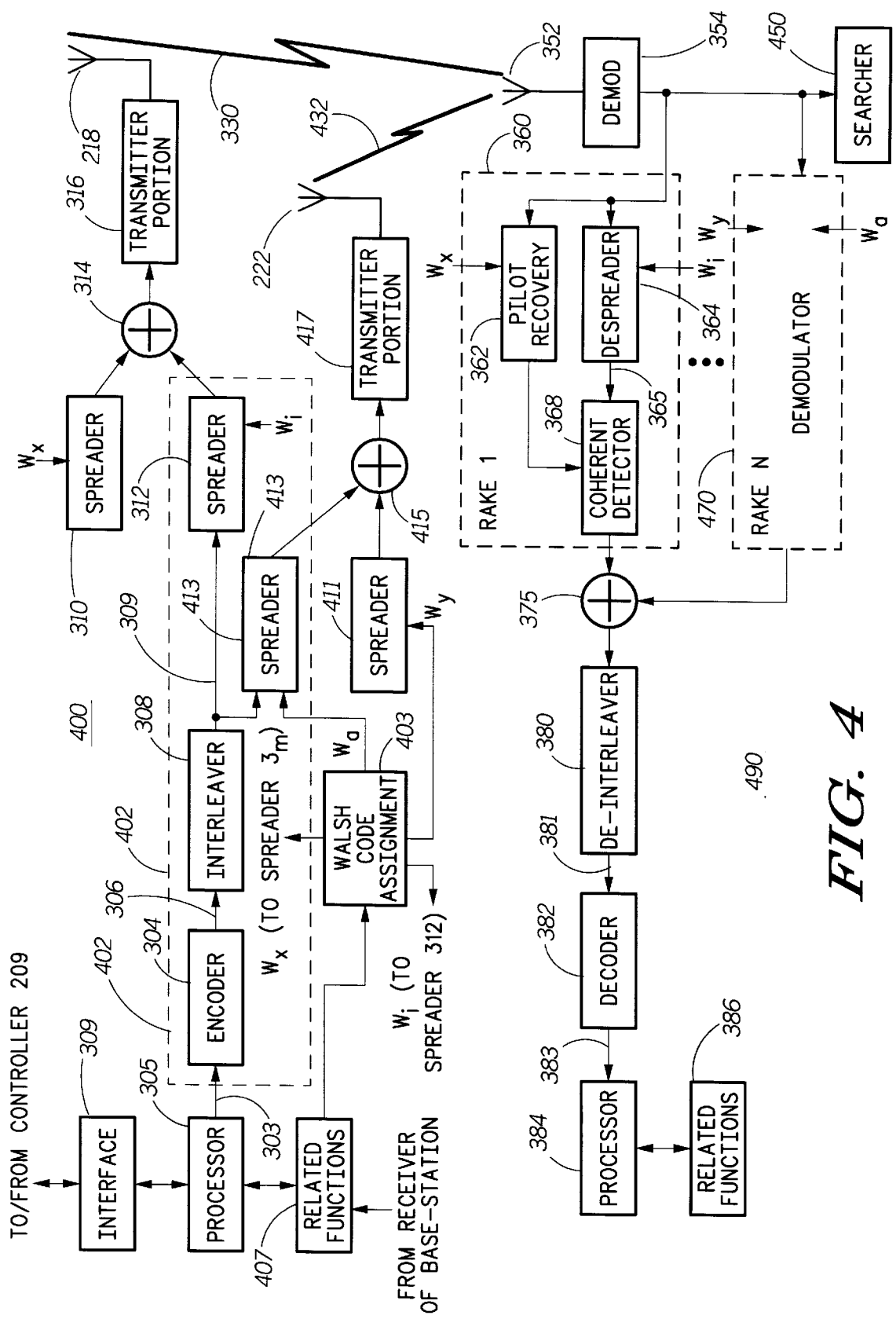
FIG. 4 generally depicts a transmitter of a base-station in CDMA communication with a mobile station using the orthogonal code assignment in accordance with the present invention.

FIG. 4 generally depicts a transmitter of a base-station in CDMA communication with a mobile station using the orthogonal code assignment in accordance with the present invention. Those blocks between FIG. 3 and FIG. 4 which have common functionality also have common numbering.

As shown in FIG. 4, the blocks up to the interleaver 308 are similar in function to the prior art transmitter 300 of FIG. 3, unless stated otherwise below. Unlike the transmitter 300 shown in FIG. 3, however, the interleaved data symbols 309 output from the interleaver 308 in FIG. 4 are input into two spreaders, spreader 312 and spreader 413. Each of these spreaders 312 and 413 convolves the interleaved symbols 309 with their orthogonal spreading sequence, namely Walsh code $W_i$ and Walsh code $W_A$ respectively. The spreading with the orthogonal spreading sequences (Walsh codes) is functionally equivalent as described above with reference to FIG. 3. Note that the encoder 304, interleaver 308 and two spreaders 312 and 413 comprise a duplicate traffic channel generator 402.

The division and assignment of Walsh codes is performed by Walsh code assignment block 403. Walsh code assignment block 403 divides a predetermined set of orthogonal codes into a plurality of subsets of orthogonal codes and assigns the subsets of orthogonal codes according to predetermined criterion. In the preferred embodiment, the predetermined criterion includes assigning the subsets of orthogonal codes to certain antennas servicing a common coverage area certain or to certain antennas within an antenna array.

Each of the spreaders 312 and 413 outputs QPSK chips at a rate of 1.2288 megachips/second (i.e., 19.2 kilosymbols/ second×64). For spreading of the pilot channel, combining the spread pilot and traffic channels and transmitting the combined pilot and traffic channels, the spreader 310, summing node 314 and transmitter portion 314 of FIG. 4 operate functionally equivalent to the corresponding blocks of FIG. 3. The spreader 411, summing node 415 and transmitter portion 417 also operate functionally equivalent to their corresponding blocks of FIG. 3. Important to note is that, unlike the prior art transmitter 300 shown in FIG. 3, each of the spreaders 310 and 411 used for spreading the pilot channel (again, all 0's) use a spreading sequence (Walsh code $W_x$ and Walsh code $W_y$, respectively) which is orthogonal to one another in accordance with the invention. This means that the transmitted spread-spectrum signals from the radio communication paths 330 and 432 are orthogonal to one another, and thus do not increase the amount of system interference to implement forward transmit diversity as in the prior art.

Still referring to FIG. 4, a receiver 490 receives the sum of both transmitted spread-spectrum signals 330 and 432 from the radio communication paths 330 and 432 via antenna 352 and is passed to demodulator 354 which functions as described above with reference to FIG. 3. The QPSK sampled signal output from demodulator 354 is despread and detected by first finger RAKE receiver 360 as described above for FIG. 3. Additionally, the QPSK sampled signal output from demodulator 354 is despread and detected by a second finger RAKE receiver 470 as essentially described above for FIG. 3, except that the QPSK sampled signal output from demodulator 354 entering this RAKE receiver 470 is despread by Walsh code $W_A$ (for the traffic channel) and Walsh code $W_y$ (for the pilot channel). Note that this differs from the prior art receiver 390 shown in FIG. 3 in that each of the RAKE receivers 360–370 have the pilot channel despread by the same Walsh code $W_x$ and the traffic channel despread by the same Walsh code $W_i$.

The assignment of a particular finger RAKE receiver to a particular communication path is performed by the searcher 450. The searcher 450 searches for all signals spread with Walsh code $W_x$ transmitted by transmitter 400; in this instance, the searcher 450 would find one signal which corresponds to radio communication path 330. With this information, the searcher 450 assigns first finger RAKE receiver 360 to communication path 330 with pilot channel Walsh code $W_x$ and traffic channel Walsh code $W_i$. A similar process is performed by the searcher 450 for signals spread with Walsh code $W_y$ transmitted by transmitter 400. In this instance, second finger RAKE receiver 470 is assigned to communication path 432 with pilot channel Walsh code Wy and traffic channel Walsh code $W_A$.

Having two pilot channels spread by different, orthogonal spreading sequences within a common coverage area (for example, sector A of FIG. 2) allows one of the pilot channels to be used as the primary pilot channel for all mobile stations within the coverage area (as in the prior art) while the other pilot channel is used as a secondary pilot channel. In this implementation, the primary pilot channel, which is used for acquisition and neighbor measurements by mobile station 106, is at a fixed, relatively high signal power level while the secondary pilot channel is at a much lower signal power level. This further acts to reduce unnecessary system interference when implementing forward link diversity in accordance with the invention.

In the above described implementation where the pilot channels have different signal power levels, a correction prior to summing in summer 375 is required such that the signals entering the summer 375 from each of the RAKE receivers 360 and 470 are at substantially the same power level. One way to accomplish this is by appropriately reducing, via an attenuator, the signals exiting Rake receiver 360 or Rake receiver 470 in accordance with the power level difference at the transmitter 400. All processing after the summer 375 is the same as described above with reference to FIG. 3.

Figure 6:
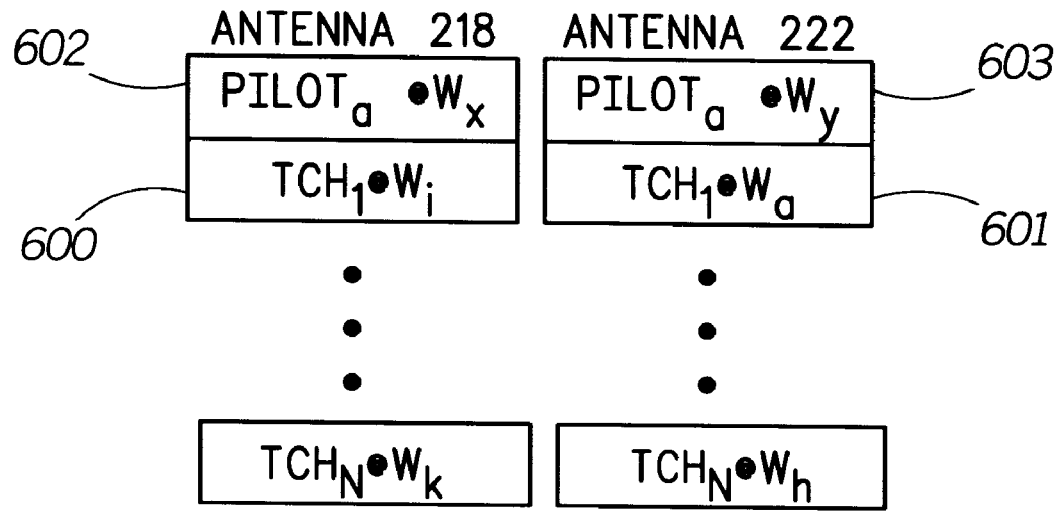
FIG. 6 generally depicts the assignment of orthogonal codes to implement forward link transmit diversity in accordance with the invention.

FIG. 6 generally depicts the assignment of orthogonal codes in the preferred embodiment to implement forward link transmit diversity in accordance with the invention. As shown in FIG. 6, each antenna 218 and 222 have a separate group of dedicated Walsh codes assigned thereto. For example, with reference to FIG. 6, a primary pilot channel transmitted via antenna 218 is spread by Walsh code $W_x$ while a secondary pilot channel transmitted via antenna 222 is spread by a different Walsh code $W_y$. Likewise, all traffic channels for each of N separate users ($TCH_N$) may each have separate Walsh codes assigned thereto on the secondary antenna 222. It is important to note, however, is that the TCH information (for example $TCH_1$ as shown in blocks 600–601) is the same information. Also important to note is that the pilot channels $Pilot_A$ shown in blocks 602–603 are likewise common pilot channels which are spread using different Walsh codes. This allows combining of the information transmitted from both base antennas within the mobile station receiver after each has been respectively demodulated with the aid of its associated pilot. It will be appreciated by one skilled in the art that the benefits provided in accordance with the invention are also realized by an alternate embodiment where the common TCH information as shown in blocks 600–601 is spread by a common Walsh code. In this case, for example, $W_i=W_A$.

It should be understood that the design of and knowledge contained within mobile station 106 is such that it properly performs a demodulation technique appropriate to whether a diversity signal is being transmitted or not. This includes full knowledge of what codes are used for all the pilots and traffic channels on each of the antennas. This may be facilitated through the use of messaging of information between the base-station 103 and mobile station 106. Methods to implement signaling of this information are known and are readily accomplished with messages provided in the IS-95 standard.

Referring to the preferred embodiment described above, by assigning the portions of information to be transmitted (either the pilot channel or the TCH) different orthogonal or Walsh codes, orthogonality within the particular coverage area (for example, sector A) can thus be maintained. By maintaining orthogonality while implementing forward link transmit diversity, all of the advantages of forward link transmit diversity are realized without degrading CDMA system performance in accordance with the invention.

Figure 7:
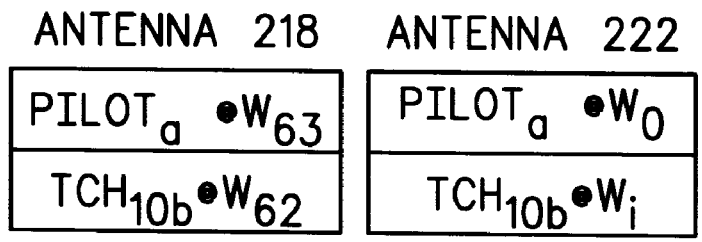
FIG. 7 generally depicts an example of an assignment of IS-95A Walsh orthogonal codes to implement forward link transmit diversity in accordance with the invention.

In its simplest form, implementation of forward link transmit diversity in accordance with the invention is the use of a different orthogonal spreading sequence to spread common pilot channels and TCHs for transmission on a second antenna. In an IS-95A scenario where 64 orthogonal (Walsh) codes are implemented, this can be accomplished by using two Walsh codes on antenna 218 which are not used on antenna 222. Such an assignment of Walsh codes for the IS-95A example is shown in FIG. 7. As shown in FIG. 7, antenna 218 is assigned Walsh code 63 to spread the pilot channel $Pilot_A$ and thus act as a pilot channel for all mobile stations that are in the transmit diversity mode, while Walsh code 62 is used to spread the TCH information intended for mobile station 106 (designated $TCH_{106}$ in FIG. 7). Antenna 222 is then assigned Walsh code 0 to spread the pilot channel $Pilot_A$ and Walsh code 1 to spread the $TCH_{106}$ information intended for mobile station 106. Walsh code 0, in this example, thus acts as the common pilot channel for all mobile stations being served by or performing mobile assisted handoff (MAHO) on that coverage area, while Walsh code 1 conveys the TCH information to the particular mobile station.

The ability to assign Walsh codes to a particular antenna leads to many beneficial features within the cellular communication system. For example, one of ordinary skill in the art will appreciate that while the concept has been explained with reference to antenna 218 and antenna 222 as shown in FIG. 2, any number of antennas can be assigned their own Walsh codes, e.g. as in an antenna array. For example, in the IS-95A situation described above, eight antennas within an antenna array can be assigned eight Walsh codes which are themselves not assigned to any other antenna, and these eight Walsh codes can then be used to spread a pilot channel for each respective antenna, for example $Pilot_A$. Mobile station 106 could then be assigned a single Walsh code for its traffic channel information $TCH_{106}$ that would then be transmitted on all of the antenna elements within the array. By setting the relative phases and amplitudes of this single Walsh code used to spread the $TCH_{106}$ information on the individual antenna elements, beamforming to direct transmit power directly at mobile station 106 is performed in accordance with the invention.

To generate a reference signal within mobile station 106 to perform coherent demodulation, base-station 103 informs mobile station 106 of the relative amplitudes and phases of the $TCH_{106}$ Walsh code that base-station 103 used to form the beam toward mobile station 106. This is accomplished by transmitting an appropriate message from base-station 103 to mobile station 106 including such information. Mobile station 106 would then determine the amplitude and phase of each of the pilot channels $Pilot_A$ spread with different Walsh codes on the individual antennas. Given the relative amplitudes and phases of the pilot channels $Pilot_A$ spread with different Walsh codes and the message from base-station 103 which includes the relative amplitudes and phases of the $TCH_{106}$ Walsh code, mobile station 106 calculates a difference vector for each different pilot channel Walsh code. The sum of all of these difference vectors is then used by the mobile station 106 to perform coherent demodulation.

Adequate signal to interference ratio necessary to improve reuse may be obtained when the same traffic channel Walsh code is used for multiple mobiles in the same sector by forming separate beams on each of the mobiles and transmitting them over the same antenna array. In each of these cases, the pilot channel/Walsh code for each antenna could be shared among all mobile stations within the coverage area of interest (for example, sector A of FIG. 2).

Another benefit resulting from the ability to assign separate pilot Walsh codes to a particular antenna is the ability to control the use of forward link transmit diversity. By using the prior art assignment scheme as shown in FIG. 5, the only "control" available is to either transmit nothing to the mobile station 106 or transmit via both antenna 218 and antenna 222. This is due to the fact that some RAKE combining algorithms weight the combining strictly on the amount of pilot signal level received. Therefore, if multiple antennas are used having the pilot signal but no proper traffic channel is present, undesirable noise may be combined causing system degradation. However, there are certain modes and/or certain characteristics which occur during a communication where the transmission of both the original signal and its delayed version via antennas 218 and 222 is not beneficial. For example, when mobile station 106 enters a soft handoff condition, and specifically a three-way soft handoff condition, the presence of the signal via antenna 222 does not help the mobile station 106 to better decode the signal (remember that mobile station 106 is only capable of resolving a total of three (3) simultaneous rays). Additionally, any more than three (3) rays transmitted to only a single mobile station 106 means that excess (unused) power is being transmitted by base-station 103, which degrades system performance. When the Walsh code assignment of FIG. 6 in accordance with the invention is implemented, however, the use of forward link transmit diversity is controllable since the mobile station 106 can now be instructed, via appropriate messaging, as to which pilot channel $Pilot_A$ to listen via the different Walsh code assignment. As such, in the three-way handoff example described above, one of the signals being transmitted via forward link transmit diversity is removed since it does not help the mobile station 106 to better decode the signal.

Other modes and/or characteristics occur during a communication which require a mechanism to inhibit or control the use of forward link transmit diversity at the base-station 103. For example, it might be necessary to inhibit forward link transmit diversity when it is determined that the radio channel (i.e., the radio frequency carrier) is experiencing excessive delay spread. Since the uplink (mobile station to base-station) and the downlink (base-station to mobile station) transmission paths tend to be reciprocal, the amount of delay spread experienced at the mobile station 106 can be inferred from the uplink transmission. If significant energy is received in multiple rays at the base-station, (as determined, for example, by knowing how many fingers are utilized to decode the uplink signal), the addition of another ray in the forward link (via antenna 218 or 222) may only serve to degrade overall system performance. This information is readily available from the receiver (not shown) of the base-station 103 and can be input into the related functions block 407 for use by the Walsh code assignment block 403 of FIG. 4.

Numerous other modes and/or characteristics occur which could serve to provide useful information upon which to help base a control decision for the use of forward link transmit diversity. These modes and/or characteristics include the receive signal strength as determined by the mobile station 106 (or the base-station 103 is the transmission paths are assumed to be reciprocal), the pilot measurement information obtained in a pilot strength measurement message (PSMM), and the delay of a signal received at the mobile station 106. This last characteristic gives a direct indication of the distance of the mobile station 106 from the base-station 103 which could then be used to determine the high likelihood of an excessive amount of delay spread.

Still another mode and/or characteristic to control the use of forward link transmit diversity could be the location of the mobile station 106. For example, a coverage area such as sector A could be pretested to determine the locations within the coverage area where forward link transmit diversity is known to provide degraded coverage to the mobile station. This pre-test information representing these locations can then be locally stored at the base-station 103 or at a central facility, such as the controller 209. When the base-station 103 determines the location of the mobile station 106, a comparison can be made to the stored information to determine if the mobile station 106 is in one of the "known-bad" locations. If the mobile station 106 is in a "known-bad" location, then forward link transmit diversity will not help the mobile station 106 and it will thus be disabled until the mobile station 106 moves into a more suitable area within the coverage area; if the mobile station is not in a "known-bad" location, then forward link transmit diversity is enabled.

In an alternate embodiment, the mobile station 106 could be equipped to determine its own location and provide this information to the base-station 103 for the comparison. One such mechanism for the mobile station 106 to determine its own location is via the use of the Global Positioning System (GPS) or the like. If the mobile station 106 is capable of determining its own position, the pre-test information could also be downloaded to the mobile station 106 and stored locally therein. In this configuration, the mobile station 106 itself could determine that it is in a "known-bad" or "known-good" location, and disable/enable reception of one of the pilot channels spread with orthogonal spreading codes accordingly in accordance with the invention.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A method of controlling transmit diversity in a communication system, the method comprising the steps of:

transmitting common traffic channel information to a mobile station within a coverage area on a radio channel via spatially separated antennas;

receiving traffic channel information at the spatially separated antennas;

based upon measurements by a base station of signal characteristics of the mobile station, determining, at the base-station, whether a predetermined number of receiver RAKE fingers have been exceeded in the mobile station; and enabling or disabling a transmission via at least one of the spatially separated antennas based on the receiver RAKE finger determination.

2. The method of claim 1, wherein the common traffic channel information transmitted to the mobile station is accomplished via pilot channels spread with orthogonal codes and transmitted via the spatially separated antennas.

3. The method of claim 2, wherein the step of disabling a transmission further comprises instructing the mobile station which pilot channel or pilot channels spread with orthogonal codes to decode.

4. The method of claim 1, wherein the step of determining characteristics further comprises determining when the mobile station is in a soft handoff.

5. The method of claim 4, wherein the step of determining characteristics further comprises determining when the mobile station is in a three-way soft handoff.

6. The method of claim 1, wherein the step of determining whether a predetermined number of receiver RAKE fingers have been exceeded in the mobile station further comprises the step of determining the location of the mobile station within the coverage area.

7. The method of claim 6, wherein the step of determining whether a predetermined number of receiver RAKE fingers have been exceeded in the mobile station further comprises the step of correlating the determined location of the mobile station with information representing locations within the coverage area known to provide degraded coverage to the mobile station.

8. The method of claim 7, wherein the step of disabling a transmission further comprises the step of disabling a transmission via at least one of the spatially separated antennas when the mobile station is in a location within the coverage area known to provide degraded coverage to the mobile station.

9. The method of claim 7, wherein the information representing locations within the coverage area known to provide degraded coverage to the mobile station is stored in a base station or a controller coupled to the base station.

10. A base-station for controlling transmit diversity in a communication system, the base-station comprising:

means for transmitting common traffic channel information to a mobile station within a coverage area on a radio channel via spatially separated antennas;

means for receiving traffic channel information at the spatially separated antennas;

based upon measurements by a base station of signal characteristics of the mobile station, means for determining, at the base-station, whether a predetermined number of receiver RAKE fingers have been exceeded in the mobile station; and means for enabling or disabling a transmission via at least one of the spatially separated antennas based on the receiver RAKE finger determination .

11. The base-station of claim 10, wherein the means for transmitting common traffic channel information to the mobile station is accomplished via pilot channels spread with orthogonal codes and transmitted via the spatially separated antennas.

12. The base-station of claim 11, wherein the means for enabling or disabling a transmission further comprises means for instructing the mobile station which pilot channel or pilot channels spread with orthogonal codes to decode.

13. The base-station of claim 10, wherein the means for determining whether a predetermined number of receiver RAKE fingers have been exceeded in the mobile station further comprises means for determining when the mobile station is in a soft handoff.

14. The base-station of claim 10, wherein the means for determining whether a predetermined number of receiver RAKE fingers have been exceeded in the mobile station further comprises means for determining the location of the mobile station within the coverage area.

15. The base-station of claim 14, wherein the means for determining whether a predetermined number of receiver RAKE fingers have been exceeded in the mobile station further comprises means for correlating the determined location of the mobile station with information representing locations within the coverage area known to provide degraded coverage to the mobile station.

16. The base-station of claim 15, wherein the means for enabling or disabling a transmission via at least one of the spatially separated antennas further comprises means for enabling or disabling a transmission via at least one of the spatially separated antennas based on a comparison between the location of the mobile station and the information representing locations within the coverage area known to provide degraded coverage to the mobile station.

17. The base-station of claim 10, including means for informing the mobile station that diversity has been disabled.

* * * * *